(12) United States Patent
Lin

(10) Patent No.: US 10,929,755 B2
(45) Date of Patent: Feb. 23, 2021

(54) OPTIMIZATION PROCESSING FOR NEURAL NETWORK MODEL

(71) Applicant: Advanced New Technologies Co., Ltd., George Town (KY)

(72) Inventor: Jianbin Lin, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/850,792

(22) Filed: Apr. 16, 2020

(65) Prior Publication Data

US 2020/0320392 A1 Oct. 8, 2020

Related U.S. Application Data

(63) Continuation of application No. PCT/CN2020/071172, filed on Jan. 9, 2020.

(30) Foreign Application Priority Data

Apr. 8, 2019 (CN) .......................... 201910275085.7

(51) Int. Cl.
*G06N 3/04* (2006.01)
*G06N 3/08* (2006.01)

(52) U.S. Cl.
CPC ............. *G06N 3/08* (2013.01); *G06N 3/0454* (2013.01)

(58) Field of Classification Search
CPC .................................................. G06N 3/0454
USPC ..................................................... 706/15, 45
See application file for complete search history.

(56) References Cited

U.S. PATENT DOCUMENTS

| 9,668,699 | B2 * | 6/2017 | Georgescu | ........... G06K 9/6255 |
| 2018/0373975 | A1 | 12/2018 | Yu et al. | |
| 2020/0006102 | A1 * | 1/2020 | Lin | ........................ G05B 19/19 |

FOREIGN PATENT DOCUMENTS

| CN | 104854602 | 8/2015 |
| CN | 109523017 | 3/2019 |
| CN | 110163341 | 8/2019 |

OTHER PUBLICATIONS

PCT International Search Report and Written Opinion in International Application No. PCT/CN2020/071172, dated Mar. 24, 2020, 16 pages (with machine translation)..

(Continued)

*Primary Examiner* — David R Vincent
(74) *Attorney, Agent, or Firm* — Fish & Richardson P.C.

(57) ABSTRACT

The present disclosure provides a method and a device for optimization processing of neural network models. The method includes the following: determining one or more target layers of the neural network model based on the number of neurons at each layer of the neural network model; for each of the one or more target layers, adding a virtual layer between the target layer and a preceding layer of the target layer, where neurons at the virtual layer are separately connected to neurons at the target layer and neurons at the preceding layer of the target layer, and addition of the virtual layer reduces the number of connections between the target layer and the preceding layer of the target layer; and training the neural network model after having added the virtual layers, to obtain an optimized neural network model.

20 Claims, 7 Drawing Sheets

(56) References Cited

OTHER PUBLICATIONS

Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.

* cited by examiner

OPTIMIZATION PROCESSING FOR NEURAL NETWORK MODEL

CROSS-REFERENCE TO RELATED APPLICATIONS

This application is a continuation of PCT Application No. PCT/CN2020/071172, filed on Jan. 9, 2020, which claims priority to Chinese Patent Application No. 201910275085.7, filed on Apr. 8, 2019, and each application is hereby incorporated by reference in its entirety.

TECHNICAL FIELD

The present disclosure usually relates to the field of computer technologies, and in particular, to methods and devices for optimization processing of neural network models.

BACKGROUND

Neural network models such as the deep neural network (DNN) models are widely used in many fields due to their strong data fitting capabilities. Generally, the fitting capability of the DNN model is directly proportional to the input feature dimensions, the number of neurons at each hidden layer, and the number of hidden layers. Thus, storing a DNN model can require substantial amounts of memory.

A 7-layer DNN model is used as an example. Assume that the numbers of neurons at all layers are respectively [1000, 2000, 1000, 500, 100, 50, 1] (assuming that the first layer is an input layer and the last layer is an output layer). The number of required model parameter is $1000*2000+2000*1000+1000*500+500*100+100*50+50*1=4555050$, and space for storing the model parameter is $4555050*4=18220200$, which is about 18 M. In fact, in the fields of image and speech processing, the required neurons are usually ten or hundred times more than the neurons shown in the example. It also means that an online system needs more memory space for storing such DNN models. Therefore, how to compress the size of the model effectively, especially when the memory space on mobile devices are generally insufficient, is particularly important.

SUMMARY

The present disclosure provides methods and devices for optimization processing of neural network models. By using the methods and devices, the neural network model can be compressed with little or no model prediction performance loss.

According to an aspect of the present disclosure, a method for optimization processing of neural network models is provided, including the following: determining one or more target layers of the neural network model based on the number of neurons at each layer of the neural network model; for each of the one or more target layers, adding a virtual layer between the target layer and a preceding layer of the target layer, where neurons at the virtual layer are separately connected to neurons at the target layer and neurons at the preceding layer of the optimization layer, and the addition of the virtual layer reduces the number of connections between the target layer and the preceding layer of the target layer; and training the neural network model after having added the virtual layers, to obtain an optimized neural network model.

Optionally, in an example of the previous aspect, the determining one or more target layers of the neural network model based on the number of neurons at each layer of the neural network model includes the following: for each layer of the neural network model, calculating a product of the number of neurons at the layer and the number of neurons at a preceding layer; and determining a layer for which the calculated product is greater than a predetermined threshold as the target layer.

Optionally, in an example of the previous aspect, the method for optimization processing of neural network models further includes the following: determining the number of neurons at the added virtual layer for each of the one or more target layers.

Optionally, in an example of the previous aspect, the number of neurons at the virtual layer is determined based on the number of neurons at the target layer, the number of neurons at the preceding layer of the target layer, and compression ratios.

Optionally, in an example of the previous aspect, the compression ratios include multiple predetermined compression ratios, one optimized neural network model is obtained for each of the multiple predetermined compression ratios, and the method further includes the following: selecting a neural network model with a smaller compression ratio and smaller prediction performance loss from multiple optimized neural network models as a final optimized neural network model.

Optionally, in an example of the previous aspect, the sorting multiple optimized neural network models sorted in terms of prediction performance loss in ascending order to select a neural network model with smaller prediction performance loss includes the following: separately inputting the same data into a non-optimized neural network model and each optimized neural network model for prediction; comparing absolute values of differences between each optimization prediction result and benchmark prediction result, and sorting the absolute values in ascending order, where the optimization prediction results are predicted by using the optimized neural network models and the benchmark prediction results are predicted by using the non-optimized neural network models; and sorting the optimized neural network models in accordance with corresponding optimization prediction results, to obtain a sequence of multiple optimized neural network models sorted in terms of prediction performance loss in ascending order.

Optionally, in an example of the previous aspect, before the virtual layer is added, connections between the neurons at the target layer and the neurons at the preceding layer of the target layer are full connections and after the virtual layer is added, connections between the neurons at the virtual layer and the neurons at the target layer are full connections, and connections between the neurons at the virtual layer and the neurons at the preceding layer of the target layer are full connections.

According to another aspect of the present disclosure, a device for optimization processing of neural network models is further provided, including the following: a target layer determining unit, configured to determine one or more target layers of the neural network model based on the number of neurons at each layer of the neural network model; a virtual layer adding unit, configured to: for each of the one or more target layers, add a virtual layer between the target layer and a preceding layer of the target layer, where neurons at the virtual layer are separately connected to neurons at the target layer and neurons at the preceding layer of the target layer, and addition of the virtual layer reduces the number of connections between the target layer and the preceding layer of the target layer; and a model training unit, configured to train the neural network model after having added the virtual layers, to obtain an optimized neural network model.

Optionally, in an example of the previous aspect, the target layer determining unit includes the following: a calculation module, configured to: for each layer of the neural network model, calculate a product of the number of neurons at the layer and the number of neurons at a preceding layer; and a target layer determining module, configured to determine a layer for which the calculated product is greater than a predetermined threshold as the target layer.

Optionally, in an example of the previous aspect, the device for optimization processing of neural network models further includes the following: a neuron quantity determining unit, configured to determine the number of neurons at the added virtual layer for each of the one or more target layers.

Optionally, in an example of the previous aspect, the number of neurons at the virtual layer is determined based on the number of neurons at the target layer, the number of neurons at the preceding layer of the target layer, and compression ratios.

Optionally, in an example of the previous aspect, the compression ratios include multiple predetermined compression ratios, one optimized neural network model is obtained for each of the multiple predetermined compression ratios, and the device includes the following: a model selection unit, configured to select a neural network model with a smaller compression ratio and smaller prediction performance loss from multiple optimized neural network models as a final optimized neural network model.

Optionally, in an example of the previous aspect, the model selection unit includes the following: a prediction module, configured to separately input the same data into a non-optimized neural network model and each optimized neural network model for prediction; a prediction result comparison module, configured to compare absolute values of differences between each optimization prediction result and benchmark prediction result, and sort the absolute values in ascending order, where the optimization prediction results are predicted by using the optimized neural network models and the benchmark prediction results are predicted by using the non-optimized neural network models; and a model sorting module, configured to sort the optimized neural network models in accordance with corresponding optimization prediction results, to obtain a sequence of multiple optimized neural network models sorted in terms of prediction performance loss in ascending order.

According to yet another aspect of the present disclosure, a computing device is provided, including one or more memory devices and one or more processors, where the one or more memory devices store executable code, and when executing the executable code, the one or more processors perform the method for optimization processing of neural network models.

According to yet another aspect of the present disclosure, a non-transitory machine-readable storage medium is provided, a computer program is stored on the non-transitory machine-readable storage medium, and when the computer program is executed by one or more computers, the one or more computers perform the method for optimization processing of neural network models.

Based on a mathematically proven equivalent lossless compression method, using the method and device for optimization processing of neural network models in the present disclosure can effectively compress the size of the neural network model, reducing the number of parameters for training and using the neural network model, saving storage space, reducing a computation amount, and resulting in little or no model prediction performance loss caused by model compression. Because the number of parameters is reduced, robustness of the neural network model against noise interference is improved while the same prediction accuracy is ensured.

BRIEF DESCRIPTION OF DRAWINGS

The essence and advantages of the present disclosure can be further understood with reference to the following accompanying drawings. In the accompanying drawings, similar components or features can have the same reference numerals.

DESCRIPTION OF IMPLEMENTATIONS

The subject matters described in the present specification are discussed in the following with reference to example implementations. It should be understood that the discussion of these implementations is merely intended to enable a person skilled in the art to better understand the subject matters described in the present specification, and is not a limitation on the protection scope, applicability, or examples set forth in the claims. The functions and sorting of the elements under discussion can be changed without departing from the protection scope of the present disclosure. Depending on a demand, examples can be omitted or replaced, or various processes or components can be added to the examples. For example, the described method can be performed in a sequence different from the described sequence, and the steps can be added, omitted, or combined. In addition, the features described in relation to some examples can be combined in other examples.

As used in the present specification, the term "include" and its variants represent open terms with a meaning of "including but not limited to". The term "based on" means "at least partially based on". The terms "one implementation" and "an implementation" represent "one or more implementations". The term "another implementation"

means "one or more other implementations". The terms "first", "second", etc. can refer to different or identical objects. The following can include other definitions, no matter explicit or implied. Unless explicitly stated in the context, the definition of one term is consistent throughout the specification.

A neural network model is a highly nonlinear dynamic system. A large number of neurons in the same form are connected to each other to form a neural network model, and these neurons are associated by using a layer as an aggregation unit. Although a structure and function of each neuron are not complex, but the dynamic behavior of the neural network model is very complex. Therefore, the neural network model can be used to represent various phenomena in the real physical world.

Figure 1:
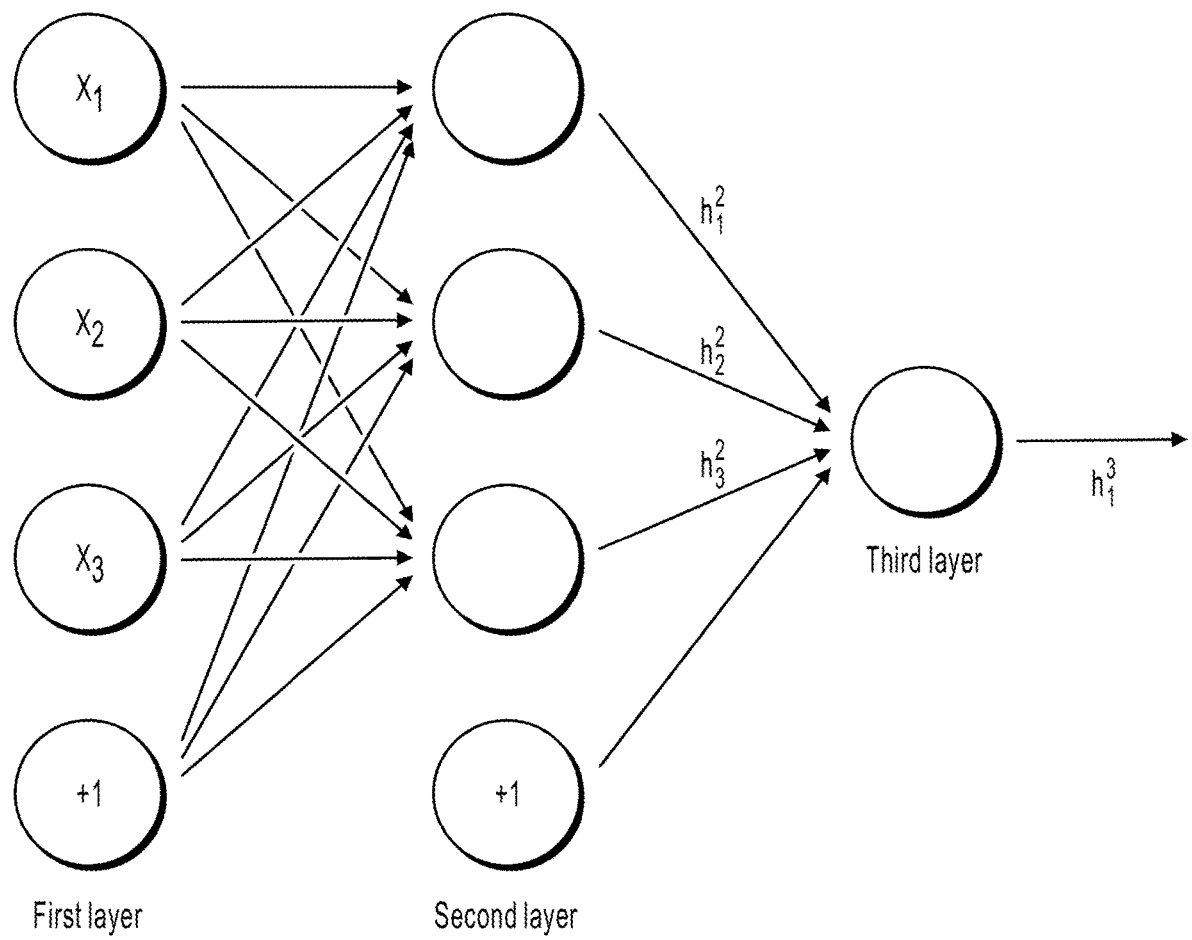
FIG. 1 is a schematic structural diagram illustrating an example of a neural network model.

FIG. 1 is a schematic structural diagram illustrating an example of a neural network model. Each node in FIG. 1 is one neuron. The neural network model includes an input layer on an input end, an output layer on an output end, and intermediate layers between the input layer and the output layer. Each layer uses a preceding layer as input, an output result is transferred to a next layer. $x_1$, $x_2$, and $x_3$ are input variables, and the outputs $h_1^2$, $h_2^2$, and $h_3^2$ of the second layer are as follows:

$$h_1^2 = \sigma(w_{11}^2 x_1 + w_{12}^2 x_2 + w_{13}^2 x_3 + b_1^2),$$

$$h_2^2 = \sigma(w_{21}^2 x_1 + w_{22}^2 x_2 + w_{23}^2 x_3 + b_2^2),$$

$$h_3^2 = \sigma(w_{31}^2 x_1 + w_{32}^2 x_2 + w_{33}^2 x_3 + b_3^2),$$

The output $h_1^3$ of the third layer is as follows:

$$h_1^3 = \sigma(w_{11}^3 h_1^2 + w_{12}^3 h_2^2 + w_{13}^3 h_3^2 + b_1^3),$$

A propagation process of the neural network model from output $h_i$ of an ith layer to output $h_{i+1}$ of an (i+1)th layer can be represented as the following matrix:

$$f(h_{i+1}) = w_{i+1} f(h_i) + b \qquad (1)$$

where $w_{i+1}$ represents a weight matrix of the i+1 layer, and dimensions of the weight matrix are $D_i \times D_{i+1}$, where $D_i$ represents the number of neurons at the ith layer and $D_{i+1}$ represents the number of neurons at the (i+1)th layer. It can be seen that, weights of each neuron at the (i+1)th layer correspond to respective connections between the neuron at the (i+1)th layer and one or more neurons at the ith layer.

Figure 2:
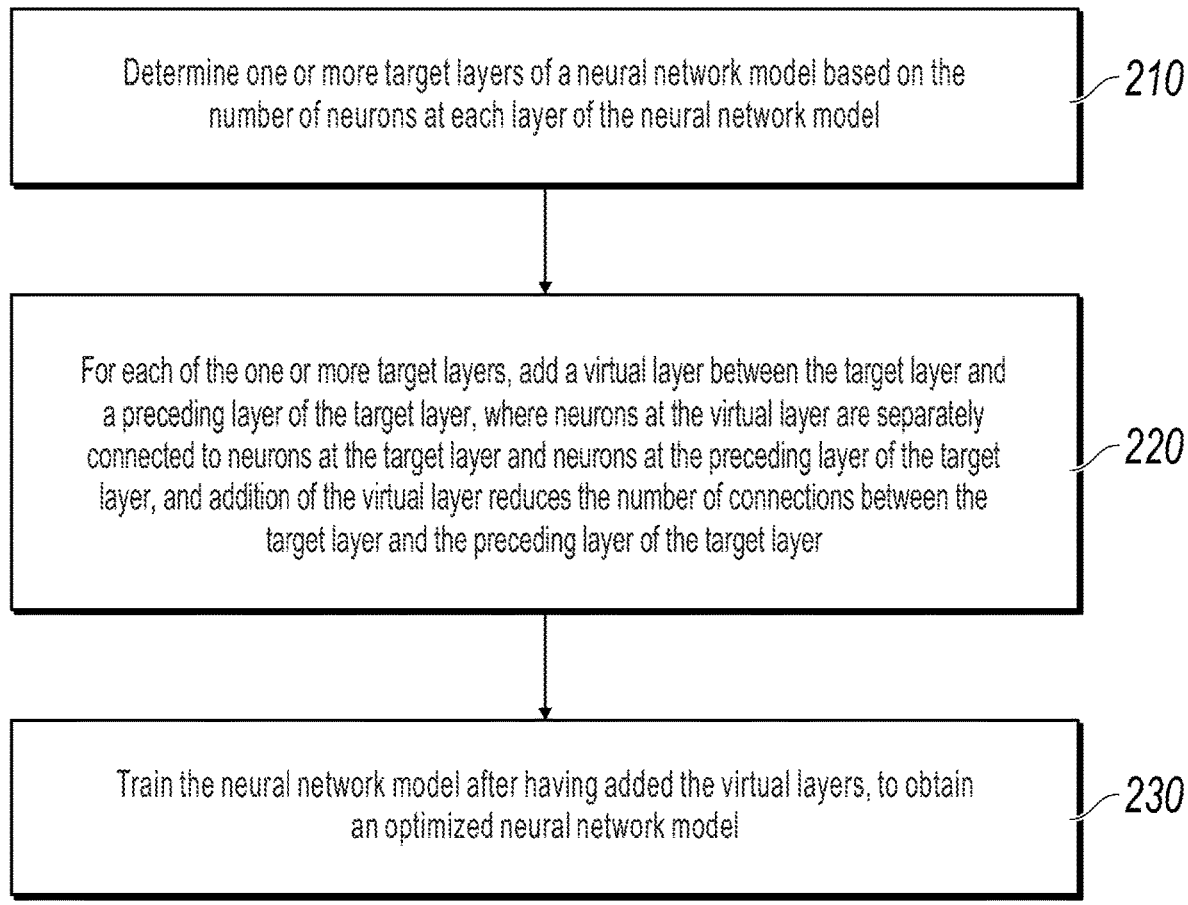
FIG. 2 is a flowchart illustrating a method for optimization processing of neural network models, according to an implementation of the present disclosure.

FIG. 2 is a flowchart illustrating a method for optimization processing of neural network models, according to an implementation of the present disclosure.

As shown in FIG. 2, at block 210, one or more target layers of the neural network model is determined based on the number of neurons at each layer of the neural network model.

For each layer of the neural network model, a product of the number N of neurons at the layer and the number M of neurons at a preceding layer is calculated. A layer for which the calculated product M*N is greater than a predetermined threshold such as 100,000 is determined as the target layer. One or more layers of one neural network model can be determined as the target layers.

At block 220, for each of the one or more target layers, a virtual layer is added between the target layer and a preceding layer of the target layer, where neurons at the virtual layer are separately connected to neurons at the target layer and neurons at the preceding layer of the target layer, and addition of the virtual layer reduces the number of connections between the target layer and the preceding layer of the target layer. In an aspect of the present implementation, one layer such as the third layer in the neural network model can be determined as the target layer, and then a virtual layer is added between the third layer and the second layer of the neural network model. In another aspect of the present implementation, multiple layers such as the fourth layer and the eighth layer in the neural network model can be determined as the target layers, and then a virtual layer is added between the fourth layer and the third layer of the neural network model, and a virtual layer is added between the eighth layer and the seventh layer of the neural network model.

Full connection means that for two adjacent layers, each neuron at one layer is connected to all neurons at the other layer. Each neuron at a fully connected layer is connected to all neurons at a preceding layer, such as the second layer shown in FIG. 1. The fully connected layer has the most parameter values than layers in other connection forms. Before the virtual layer is added, connections between the neurons at the target layer and the neurons at the preceding layer of the target layer are full connections. After the virtual layer is added, connections between the neurons at the virtual layer and the neurons at the target layer can be full connections, and connections between the neurons at the virtual layer and the neurons at the preceding layer of the target layer can be full connections.

In an optional implementation, the number of neurons at the added virtual layer is directly set to a predetermined number.

In another optional implementation, the number of neurons at the added virtual layer is determined for each of the one or more target layers, so that the number of neurons at the added virtual layer is $$Z < \frac{M \times N}{M + N}.$$

Here, N represents the number of neurons at the target layer and M represents the number of neurons at the preceding layer of the target layer. Further, the number of neurons at the virtual layer is determined based on the number of neurons at the target layer, the number of neurons at the preceding layer of the target layer, and compression ratios. For example, the number Z of neurons at the virtual layer can be determined by using the following formula:

$$Z = \frac{x \times M \times N}{M + N}.$$

Here, x represents the compression ratio, N represents the number of neurons at the target layer, and M represents the number of neurons at the preceding layer of the target layer.

At block 230, the neural network model after having added the virtual layers is trained to obtain an optimized neural network model. After the neural network model after having added the virtual layers is trained, weights corresponding to connections between each neuron at each layer of the neural network model and one or more neurons at a preceding layer are obtained.

The compression ratio x can include multiple predetermined compression ratios such as 10%, 20%, 30%, etc. One optimized neural network model is obtained for each of the multiple predetermined compression ratios. The final optimized neural network model is selected from multiple optimized neural network models based on criteria of smaller prediction performance loss and a smaller compression ratio. Therefore, multiple optimized neural network models are sorted in terms of prediction performance loss in ascending order, so that a neural network model with smaller prediction performance loss is selected from the multiple optimized neural network models. The following uses an example to describe a method for sorting multiple optimized neural network models sorted in terms of prediction performance loss in ascending order.

Figure 3:
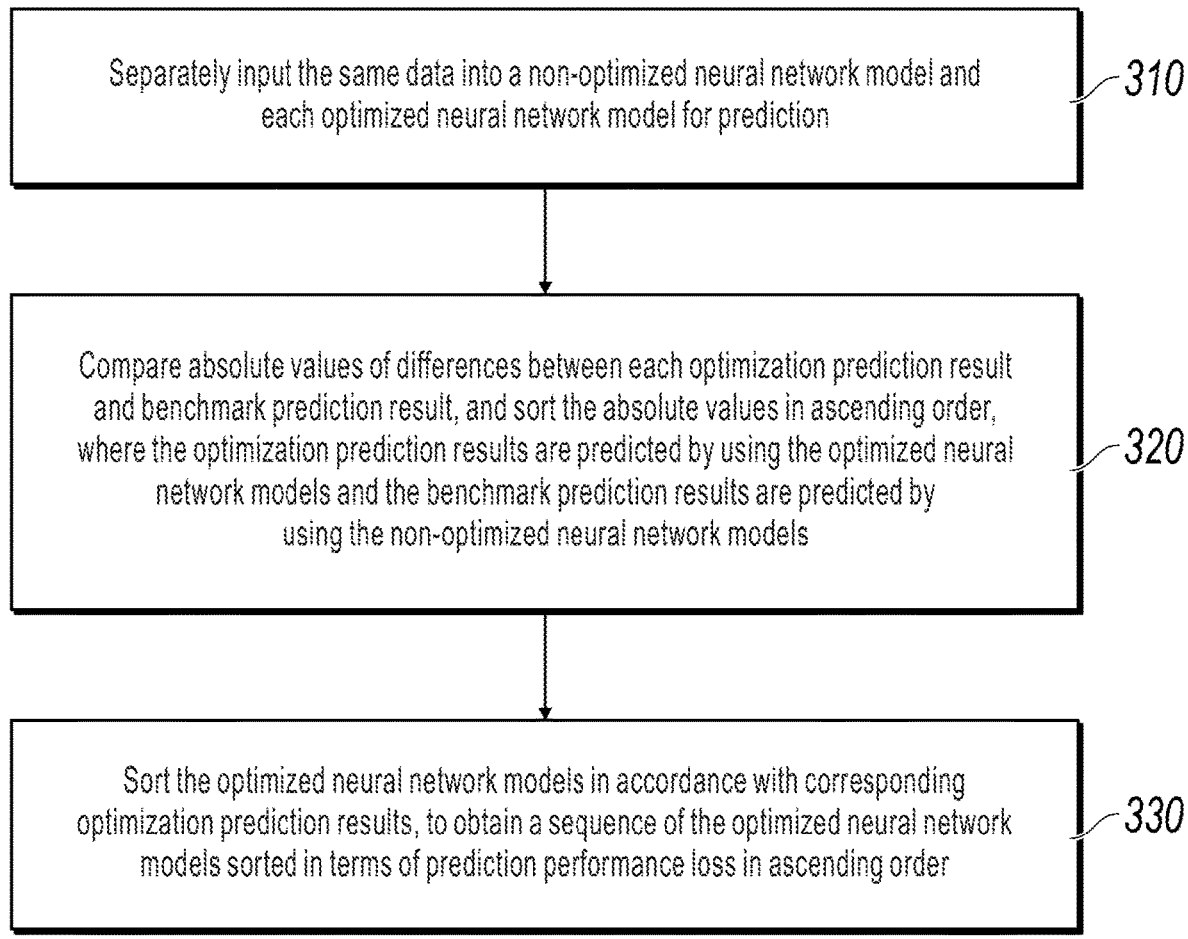
FIG. 3 is a flowchart illustrating a method for sorting multiple optimized neural network models sorted in terms of prediction performance loss in ascending order, according to an example.

FIG. 3 is a flowchart illustrating a method for sorting multiple optimized neural network models sorted in terms of prediction performance loss in ascending order, according to an example.

As shown in FIG. 3, at block 310, the same data is separately input into a non-optimized neural network model and each optimized neural network model for prediction.

At block 320, absolute values of differences between each optimization prediction result and benchmark prediction result are compared and sorted in ascending order, where the optimization prediction results are predicted by using the optimized neural network models and the benchmark prediction results are predicted by using the non-optimized neural network models.

At block 330, the optimized neural network models are sorted in accordance with corresponding optimization prediction results, to obtain a sequence of multiple optimized neural network models sorted in terms of prediction performance loss in ascending order.

Figure 4A:
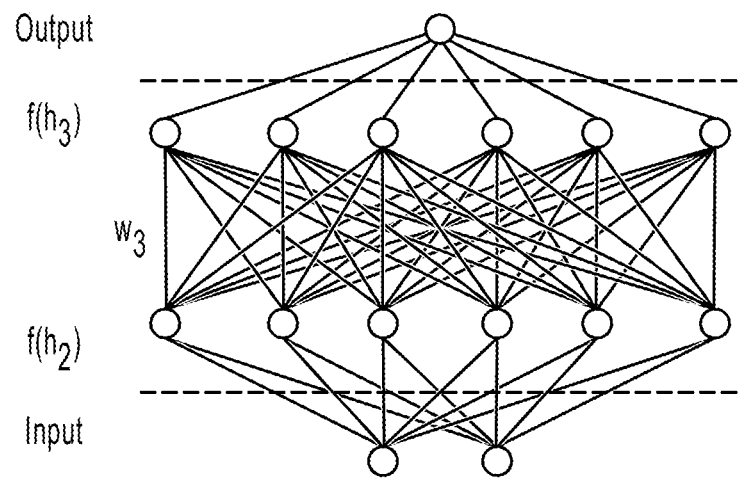
FIG. 4A is a schematic structural diagram illustrating an example of a non-optimized neural network model.
Figure 4B:
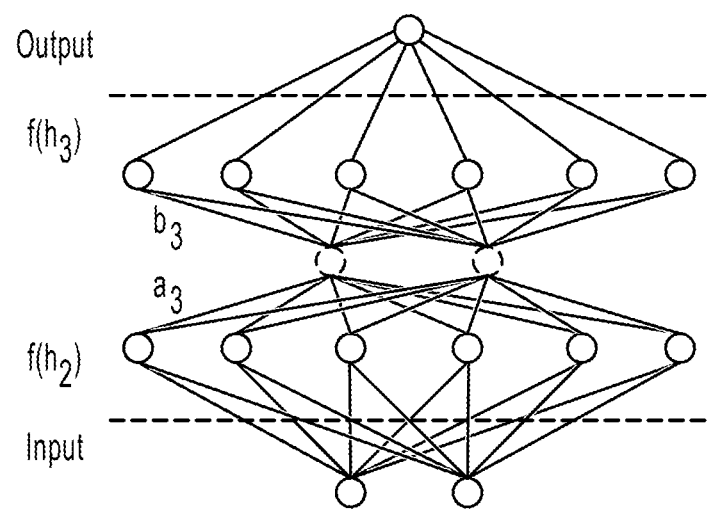
FIG. 4B is a schematic structural diagram illustrating the neural network model shown in FIG. 4A after optimization.

FIG. 4A is a schematic structural diagram illustrating an example of a non-optimized neural network model. FIG. 4B is a schematic structural diagram illustrating the neural network model shown in FIG. 4A after optimization. The dotted nodes represent neurons at the virtual layer that is added between the third layer and the second layer of the neural network model shown in FIG. 4A.

An output matrix $f(h_3)$ of the third layer in the non-optimized neural network model shown in FIG. 4A is as follows:

$$f(h_3)=w_3 f(h_2)+b \qquad (2)$$

where $w_3$ represents a weight matrix of the third layer, and dimensions of the weight matrix are $D_2 \times D_3$, where $D_2$ represents the number of neurons at the second layer and $D_3$ represents the number of neurons at the third layer.

Assume that the dimensions of the weight matrix $w_3$ are M×N. The matrix $w_3$ can be represented as follows:

$$w_{M \times N}=a_{M \times Z} b_{Z \times N} \qquad (3)$$

The matrix $w_3$ includes M×N values. After the matrix $w_3$ is decomposed into two matrices a3 and b3, a total of M×Z+Z×N values are included, where M×Z+Z×N<M×N.

Therefore, an output matrix f(h3) of the third layer in the optimized neural network model shown in FIG. 4B can be represented as follows:

$$f(h_3)=a_3 b_3 f(h_2)+b \qquad (4)$$

It is mathematically proven in the previous description that, the weight matrix before compression is equivalent to the weight matrix after compression. Therefore, theoretically, the matrix decomposition does not affect prediction performance of the model.

Based on a mathematically proven equivalent lossless compression method, using the method for optimization processing of neural network models in the previous implementation can effectively compress a size of the neural network model, reducing the number of parameters for training and using the neural network model, saving storage space, reducing a computation amount, and resulting in little or no model prediction performance loss caused by model compression. Because the number of parameters is reduced, robustness of the neural network model against noise interference is improved while the same prediction accuracy is ensured.

Figure 5:
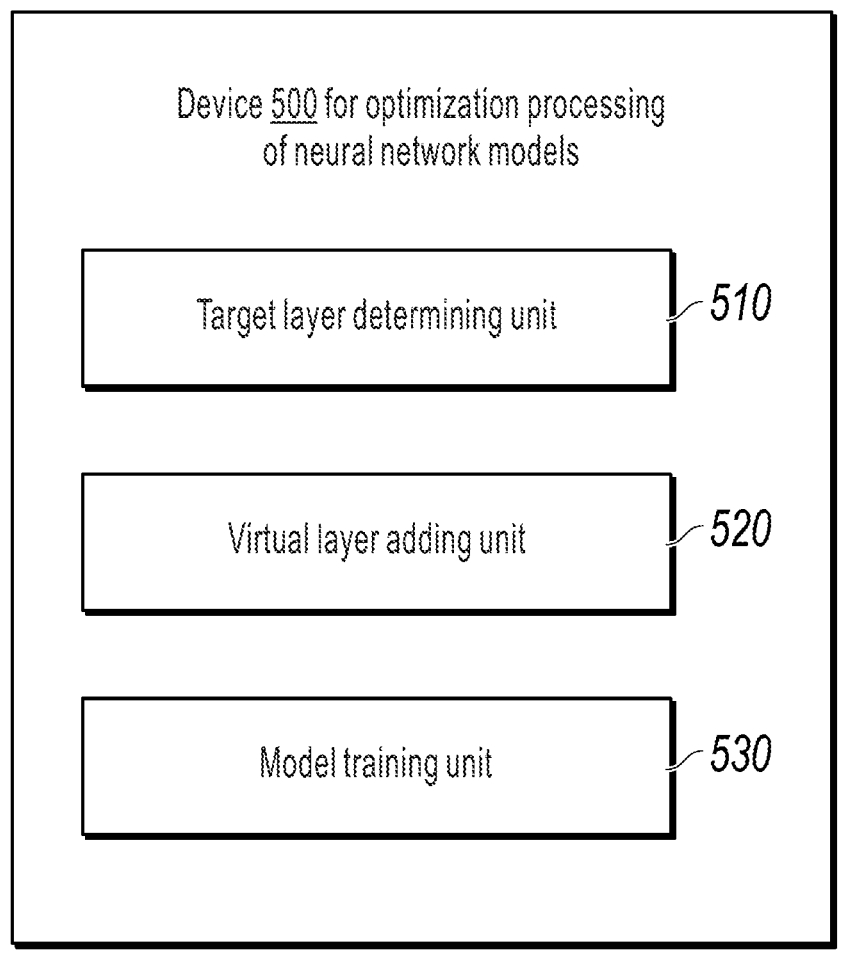
FIG. 5 is a schematic structural diagram illustrating a device 500 for optimization processing of neural network models, according to an implementation of the present disclosure.

FIG. 5 is a schematic structural diagram illustrating a device 500 for optimization processing of neural network models, according to an implementation of the present disclosure. As shown in FIG. 5, the device 500 for optimization processing of neural network models in the present implementation includes a target layer determining unit 510, a virtual layer adding unit 520, and a model training unit 530.

The target layer determining unit 510 is configured to determine one or more target layers of the neural network model based on the number of neurons at each layer of the neural network model. For operations of the target layer determining unit 510, references can be made to the operations of block 210 described above with reference to FIG. 2. The target layer determining unit 510 can include a calculation module and a target layer determining module. The calculation module is configured to: for each layer of the neural network model, calculate a product of the number of neurons at the layer and the number of neurons at a preceding layer. The target layer determining module is configured to determine a layer for which the product of the number of neurons at the layer and the number of neurons at the preceding layer calculated by the calculation module is greater than a predetermined threshold such as 100,000 as the target layer.

The virtual layer adding unit 520 is configured to: for each of the one or more target layers, add a virtual layer between the target layer and a preceding layer of the target layer, where neurons at the virtual layer are separately connected to neurons at the target layer and neurons at the preceding layer of the target layer, and addition of the virtual layer reduces the number of connections between the target layer and the preceding layer of the target layer. For operations of the virtual layer adding unit 520, references can be made to the operations of block 220 described above with reference to FIG. 2.

The model training unit 530 is configured to train the neural network model after having added the virtual layers, to obtain an optimized neural network model. For operations of the model training unit 530, references can be made to the operations of block 230 described above with reference to FIG. 2.

Figure 6:
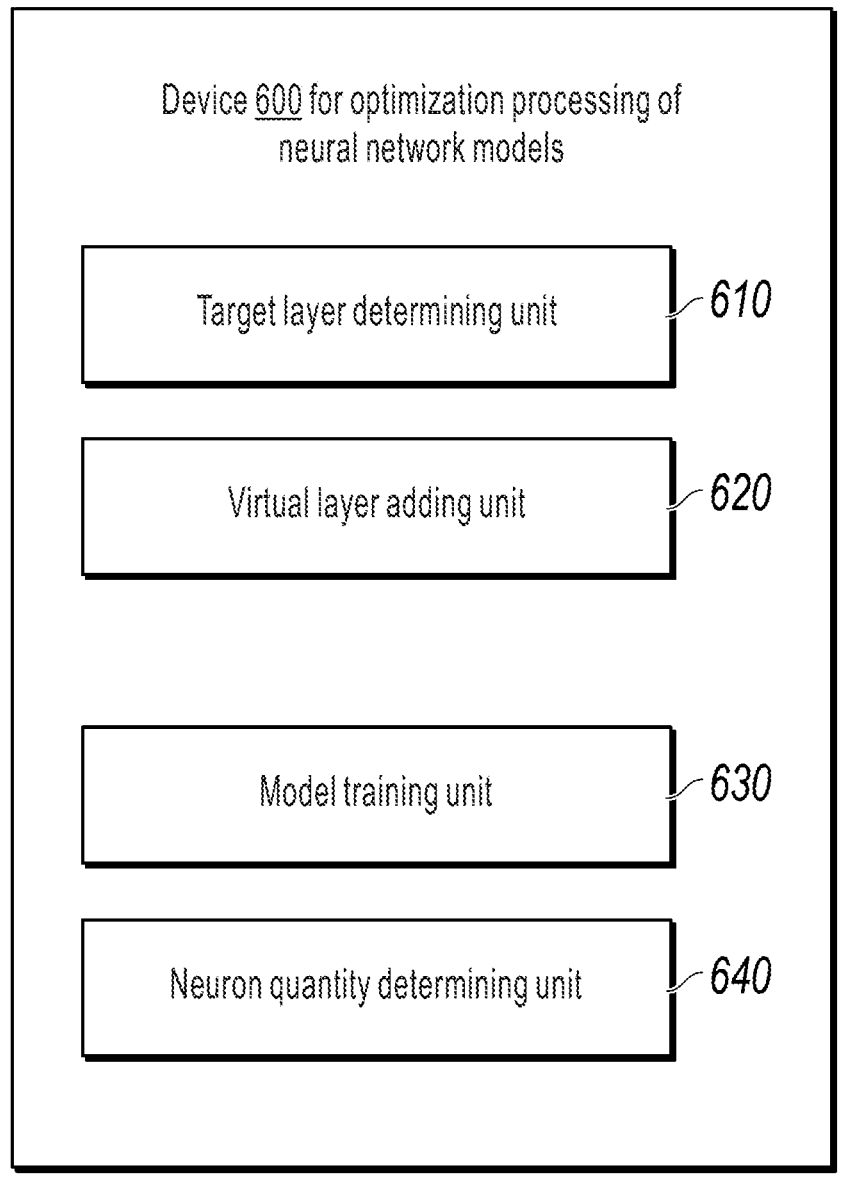
FIG. 6 is a schematic structural diagram illustrating a device 600 for optimization processing of neural network models, according to another implementation of the present disclosure.

FIG. 6 is a schematic structural diagram illustrating a device 600 for optimization processing of neural network models, according to another implementation of the present disclosure. As shown in FIG. 6, the device 600 for optimization processing of neural network models in the present implementation includes a target layer determining unit 610, a virtual layer adding unit 620, a model training unit 630, and a neuron quantity determining unit 640.

The target layer determining unit 610 is configured to determine one or more target layers of the neural network model based on the number of neurons at each layer of the neural network model. For operations of the target layer determining unit 610, references can be made to the operations of block 210 described above with reference to FIG. 2.

The virtual layer adding unit 620 is configured to: for each of the one or more target layers, add a virtual layer between the target layer and a preceding layer of the target layer, where neurons at the virtual layer are separately connected to neurons at the target layer and neurons at the preceding layer of the target layer, and addition of the virtual layer reduces the number of connections between the target layer and the preceding layer of the target layer. For operations of the virtual layer adding unit 620, references can be made to the operations of block 220 described above with reference to FIG. 2.

The model training unit 630 is configured to train the neural network model after having added the virtual layers, to obtain an optimized neural network model. For operations of the model training unit 630, references can be made to the operations of block 230 described above with reference to FIG. 2.

The neuron quantity determining unit 640 is configured to determine the number of neurons at the added virtual layer for each of the one or more target layers. Further, the number of neurons at the virtual layer can be determined based on the number of neurons at the target layer, the number of neurons at the preceding layer of the target layer, and compression ratios. For operations of the neuron quantity determining unit 640, references can be made to the operations of block 220 described above with reference to FIG. 2.

The compression ratios can include multiple predetermined compression ratios such as 10%, 20%, 30%, 40%, etc. One optimized neural network model is obtained for each of the multiple predetermined compression ratios. The device 600 for optimization processing of neural network models in the present implementation can further include a model selection unit, configured to select a neural network model with a smaller compression ratio and smaller prediction performance loss from multiple optimized neural network models as a final optimized neural network model.

Further, the model selection unit can include a prediction module, a prediction result comparison module, and a model sorting module. The prediction module is configured to separately input the same data into a non-optimized neural network model and each optimized neural network model for prediction. For operations of the prediction module, references can be made to the operations of block 310 described above with reference to FIG. 3. The prediction result comparison module is configured to compare absolute values of differences between each optimization prediction result and benchmark prediction result, and sort the absolute values in ascending order, where the optimization prediction results are predicted by using the optimized neural network models and the benchmark prediction results are predicted by using the non-optimized neural network models. For operations of the prediction result comparison module, references can be made to the operations of block 320 described above with reference to FIG. 3. The model sorting module is configured to sort the optimized neural network models in accordance with corresponding optimization prediction results, to obtain a sequence of multiple optimized neural network models sorted in terms of prediction performance loss in ascending order. For operations of the model sorting module, references can be made to the operations of block 330 described above with reference to FIG. 3.

Figure 7:
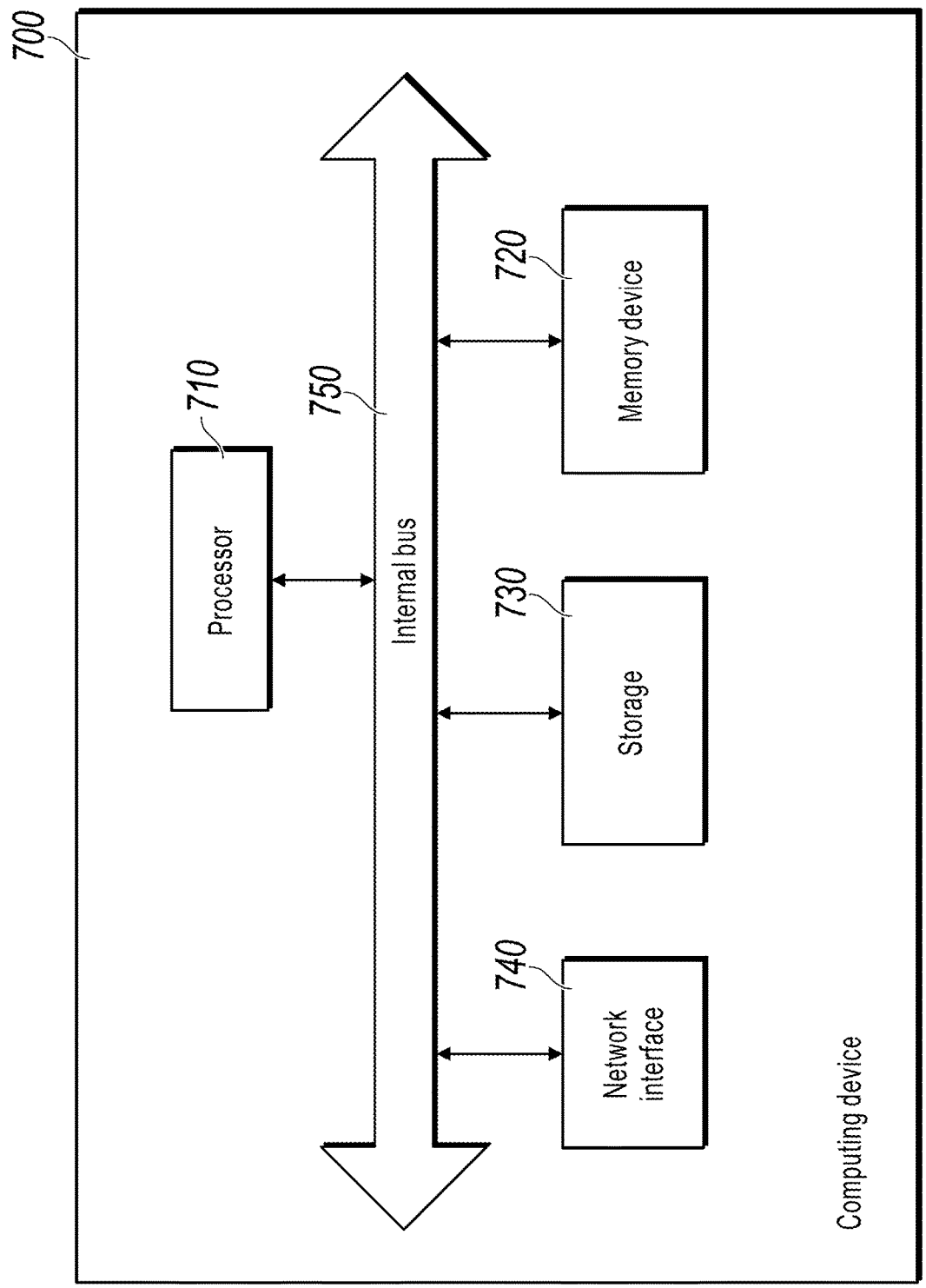
FIG. 7 is a structural block diagram illustrating a computing device for optimization processing of neural network models, according to an implementation of the present disclosure.

FIG. 7 is a structural block diagram illustrating a computing device for optimization processing of neural network models, according to an implementation of the present disclosure.

As shown in FIG. 7, a computing device 700 can include one or more processors 710, one or more memory devices 720, one or more storage 730, one or more communications interfaces 740, and one or more internal buses 750. The one or more processors 710 executes one or more computer readable instructions (i.e., the previous elements implemented in software form) stored or coded in the computer readable storage medium (i.e., the memory device 720).

In an implementation, the memory device 720 stores a computer executable instruction. When the instruction is executed, the one or more processors 710 is enabled to perform the following operations: determining one or more target layers of the neural network model based on the number of neurons at each layer of the neural network model; for each of the one or more target layers, adding a virtual layer between the target layer and a preceding layer of the target layer, where neurons at the virtual layer are separately connected to neurons at the target layer and neurons at the preceding layer of the target layer, and addition of the virtual layer reduces the number of connections between the target layer and the preceding layer of the target layer; and training the neural network model after having added the virtual layers, to obtain an optimized neural network model.

It should be understood that, when being executed, the computer executable instruction stored in the memory device 720 enables the one or more processors 710 to perform the previous operations and functions described with reference to FIG. 1 to FIG. 6 in the implementations of the present disclosure.

In the present disclosure, the computing device 700 can include, but is not limited to, a personal computer, a server computer, a workstation, a desktop computer, a laptop computer, a notebook computer, a mobile computing device, a smartphone, a tablet computer, a cellular phone, a personal digital assistant (PDA), a handheld device, a message transceiver device, a wearable computing device, a user electronic device, etc.

According to an implementation, a program product such as a non-transient machine readable medium is provided. The non-transient machine readable medium can have an instruction (i.e., the previous elements implemented in software form). When the instruction is executed by a machine, the machine is enabled to perform the previous operations and functions described with reference to FIG. 1 to FIG. 6 in the implementations of the present disclosure.

A system or a device equipped with a readable storage medium can be provided. The readable storage medium stores software program code that implements the functions of any of the implementations described above, and enables the computer or processor of the system or device to read and execute the instruction stored in the readable storage medium.

In such case, the program code read from the readable medium can implement the functions of any of the implementations described above, so that the machine readable code and the readable storage medium storing the machine readable code form a part of the present disclosure.

Implementations of the readable storage medium include a floppy disk, a hard disk, a magneto-optical disk, an optical disk (such as a CD-ROM, a CD-R, a CD-RW, a DVD-ROM, a DVD-RAM, a DVD-RW, and a DVD-RW), a magnetic tape, a non-volatile memory card, and a ROM. Alternatively, the program code can be downloaded from a server computer or cloud by a communications network.

A person skilled in the art should understand that, various variations and modifications can be made to the implementations disclosed above without departing from the essence of the present disclosure. Therefore, the protection scope of the present disclosure shall be subject to the appended claims.

It is worthwhile to note that, not all the steps and units in the above-mentioned processes and system structure diagrams are necessary, and some steps or units can be ignored depending on a demand. The sequence of steps is not fixed and can be determined depending on a demand. The device structure described in the previous implementations can be a physical structure or a logical structure, that is, some units can be implemented by a same physical entity, or some units can be implemented by multiple physical entities, or can be implemented jointly by some of the multiple independent devices.

In the previous implementations, hardware units or modules can be implemented in a mechanical or electrical form. For example, a hardware unit, module, or processor can include a permanent dedicated circuit or logic (such as a dedicated processor, FPGA, or ASIC) to perform corresponding operations. Hardware units or processors can further include programmable logic or circuits (such as general-purpose processors or other programmable processors), and can be temporarily set by software to perform corresponding operations. Specific implementations (mechanical methods, dedicated permanent circuits, or temporarily disposed circuits) can be determined based on cost and time considerations.

The specific implementations described above with reference to the accompanying drawings describe example implementations, but do not represent all implementations that can be implemented or fall within the protection scope of the claims. The term "illustrative" as used throughout the present specification means "used as an example, an instance, or illustration" and does not mean "preferred" or "advantageous" over other implementations. Specific implementations include specific details for the purpose of providing an understanding of the described technologies. However, these technologies can be implemented without these specific details. In some examples, well-known structures and devices are shown in block diagrams in order to avoid making it difficult to understand the concepts of the described implementations.

The previous descriptions of the present disclosure are provided to enable any person of ordinary skill in the art to implement or use the present disclosure. Various modifications to the present disclosure are apparent to a person of ordinary skill in the art, and the general principles defined in the present specification can also be applied to other variations without departing from the protection scope of the present disclosure. Therefore, the present disclosure is not limited to the examples and designs described in the present specification, but is consistent with the widest range of principles and novelty characteristics compliant with the present disclosure.

What is claimed is:

1. A computer-implemented method for optimization processing of a neural network model, the method comprising:
   determining one or more target layers of the neural network model based on a number of neurons at each layer of the neural network model;
   for each of the one or more target layers, adding a virtual layer between the target layer and a preceding layer of the target layer, wherein neurons at the virtual layer are separately connected to neurons at the target layer and neurons at the preceding layer of the target layer, and addition of the virtual layer reduces a number of connections between the target layer and the preceding layer of the target layer; and
   training the neural network model after having added the virtual layers, to obtain an optimized neural network model.

2. The computer-implemented method of claim 1, wherein determining the one or more target layers of the neural network model based on the number of neurons at each layer of the neural network model comprises:
   for each particular layer of the neural network model, calculating a product of a number of neurons at the particular layer and a number of neurons at a second layer preceding the particular layer; and
   determining a first layer for which the calculated product is greater than a predetermined threshold as the target layer.

3. The computer-implemented method of claim 1, further comprising:
   determining a number of neurons at an added virtual layer for each of the one or more target layers.

4. The computer-implemented method of claim 3, wherein the number of neurons at the virtual layer is determined based on a number of neurons at the target layer, a number of neurons at the preceding layer of the target layer, and compression ratios.

5. The computer-implemented method of claim 4, wherein the compression ratios comprise multiple predetermined compression ratios, one optimized neural network model is obtained for each of the multiple predetermined compression ratios, and the method further comprises:
   selecting an initial neural network model with a smaller compression ratio and smaller prediction performance loss from multiple optimized neural network models as a final optimized neural network model.

6. The computer-implemented method of claim 5, wherein selecting the initial neural network model with smaller prediction performance loss from the multiple optimized neural network models comprises:
   separately inputting a first set of data into a non-optimized neural network model and each optimized neural network model for prediction;
   comparing absolute values of differences between each optimization prediction result and benchmark prediction result, and sorting the absolute values in ascending order, wherein the optimization prediction results are predicted by using the optimized neural network models and the benchmark prediction results are predicted by using the non-optimized neural network models; and
   sorting the optimized neural network models in accordance with corresponding optimization prediction results, to obtain a sequence of multiple optimized neural network models sorted in terms of prediction performance loss in ascending order, wherein the neural network model with smaller prediction performance loss is selected from the multiple optimized neural network models.

7. The computer-implemented method of claim 1, wherein before the virtual layer is added, connections between the neurons at the target layer and the neurons at the preceding layer of the target layer are full connections; and
   after the virtual layer is added, connections between the neurons at the virtual layer and the neurons at the target layer are full connections, and connections between the neurons at the virtual layer and the neurons at the preceding layer of the target layer are full connections.

8. A non-transitory, computer-readable medium storing one or more instructions executable by a computer system to perform operations comprising:
   determining the one or more target layers of a neural network model based on a number of neurons at each layer of the neural network model;
   for each of the one or more target layers, adding a virtual layer between the target layer and a preceding layer of the target layer, wherein neurons at the virtual layer are separately connected to neurons at the target layer and neurons at the preceding layer of the target layer, and addition of the virtual layer reduces a number of connections between the target layer and the preceding layer of the target layer; and training the neural network model after having added the virtual layers, to obtain an optimized neural network model.

9. The non-transitory, computer-readable medium of claim 8, wherein determining the one or more target layers of the neural network model based on the number of neurons at each layer of the neural network model comprises:

for each particular layer of the neural network model, calculating a product of a number of neurons at the particular layer and a number of neurons at a second layer preceding the particular layer; and determining a first layer for which the calculated product is greater than a predetermined threshold as the target layer.

10. The non-transitory, computer-readable medium of claim 8, further comprising:

determining a number of neurons at an added virtual layer for each of the one or more target layers.

11. The non-transitory, computer-readable medium of claim 10, wherein the number of neurons at the virtual layer is determined based on a number of neurons at the target layer, a number of neurons at the preceding layer of the target layer, and compression ratios.

12. The non-transitory, computer-readable medium of claim 11, wherein the compression ratios comprise multiple predetermined compression ratios, one optimized neural network model is obtained for each of the multiple predetermined compression ratios, further comprising:

selecting an initial neural network model with a smaller compression ratio and smaller prediction performance loss from multiple optimized neural network models as a final optimized neural network model.

13. The non-transitory, computer-readable medium of claim 12, wherein selecting the neural network model with smaller prediction performance loss from the multiple optimized neural network models comprises:

separately inputting a first set of data into a non-optimized neural network model and each optimized neural network model for prediction;

comparing absolute values of differences between each optimization prediction result and benchmark prediction result, and sorting the absolute values in ascending order, wherein the optimization prediction results are predicted by using the optimized neural network models and the benchmark prediction results are predicted by using the non-optimized neural network models; and sorting the optimized neural network models in accordance with corresponding optimization prediction results, to obtain a sequence of multiple optimized neural network models sorted in terms of prediction performance loss in ascending order, wherein the initial neural network model with smaller prediction performance loss is selected from the multiple optimized neural network models.

14. The non-transitory, computer-readable medium of claim 8, wherein before the virtual layer is added, connections between the neurons at the target layer and the neurons at the preceding layer of the target layer are full connections; and after the virtual layer is added, connections between the neurons at the virtual layer and the neurons at the target layer are full connections, and connections between the neurons at the virtual layer and the neurons at the preceding layer of the target layer are full connections.

15. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

determining one or more target layers of a neural network model based on a number of neurons at each layer of the neural network model;

for each of the one or more target layers, adding a virtual layer between the target layer and a preceding layer of the target layer, wherein neurons at the virtual layer are separately connected to neurons at the target layer and neurons at the preceding layer of the target layer, and addition of the virtual layer reduces a number of connections between the target layer and the preceding layer of the target layer; and training the neural network model after having added the virtual layers, to obtain an optimized neural network model.

16. The computer-implemented system of claim 15, wherein determining the one or more target layers of the neural network model based on the number of neurons at each layer of the neural network model comprises:

for each particular layer of the neural network model, calculating a product of a number of neurons at a particular layer and the number of neurons at a second layer preceding the particular layer; and determining a first layer for which the calculated product is greater than a predetermined threshold as the target layer.

17. The computer-implemented system of claim 15, further comprising:

determining a number of neurons at an added virtual layer for each of the one or more target layers.

18. The computer-implemented system of claim 17, wherein the number of neurons at the virtual layer is determined based on a number of neurons at the corresponding target layer, a number of neurons at the preceding layer of the target layer, and compression ratios.

19. The computer-implemented system of claim 18, wherein the compression ratios comprise multiple predetermined compression ratios, one optimized neural network model is obtained for each of the multiple predetermined compression ratios, further comprising:

selecting an initial neural network model with a smaller compression ratio and smaller prediction performance loss from multiple optimized neural network models as a final optimized neural network model.

20. The computer-implemented system of claim 19, wherein selecting the neural network model with smaller prediction performance loss from the multiple optimized neural network models comprises:

separately inputting a first set of data into a non-optimized neural network model and each optimized neural network model for prediction;

comparing absolute values of differences between each optimization prediction result and benchmark prediction result, and sorting the absolute values in ascending order, wherein the optimization prediction results are predicted by using the optimized neural network models and the benchmark prediction results are predicted by using the non-optimized neural network models; and sorting the optimized neural network models in accordance with corresponding optimization prediction results, to obtain a sequence of multiple optimized neural network models sorted in terms of prediction performance loss in ascending order, wherein the neural network model with smaller prediction performance loss is selected from the multiple optimized neural network models.

* * * * *

UNITED STATES PATENT AND TRADEMARK OFFICE
CERTIFICATE OF CORRECTION

| | | |
|---|---|---|
| PATENT NO. | : 10,929,755 B2 | Page 1 of 1 |
| APPLICATION NO. | : 16/850792 | |
| DATED | : February 23, 2021 | |
| INVENTOR(S) | : Jianbin Lin | |

It is certified that error appears in the above-identified patent and that said Letters Patent is hereby corrected as shown below:

On the Title Page

Item (56) – under References cited, Other Publication, delete "translation).." and insert -- translation). -- therefor.

In the Claims

Column 11/Line 56 – In Claim 1, delete "the" and insert -- a -- therefor.

Column 12/Line 24 – In Claim 5, delete "an initial" and insert -- a -- therefor.

Column 12/Line 29 – In Claim 6, delete "initial" therefor.

Column 12/Line 63 – In Claim 8, delete "the" therefor.

Column 12/Line 67 – In Claim 8, delete "the" and insert -- a -- therefor.

Column 13/Line 36 – In Claim 12, delete "an initial" and insert -- a -- therefor.

Column 13/Line 59 – In Claim 13, delete "initial" therefor.

Column 14/Line 18 – In Claim 15, delete "the" and insert -- a -- therefor.

Column 14/Line 33 – In Claim 16, delete "a" and insert -- the -- therefor.

Column 14/Line 34 – In Claim 16, delete "the" and insert -- a -- therefor.

Column 14/Lines 45-46 – In Claim 18, delete "corresponding" therefor.

Column 14/Line 53 – In Claim 19, delete "an initial" and insert -- a -- therefor.

Signed and Sealed this
Eleventh Day of January, 2022

Drew Hirshfeld
*Performing the Functions and Duties of the
Under Secretary of Commerce for Intellectual Property and
Director of the United States Patent and Trademark Office*